A. M. McDOUGALL.
METHOD OF PRESERVING AND MARKETING FRESH FISH.
APPLICATION FILED JAN. 16, 1914.
1,140,178. Patented May 18, 1915.
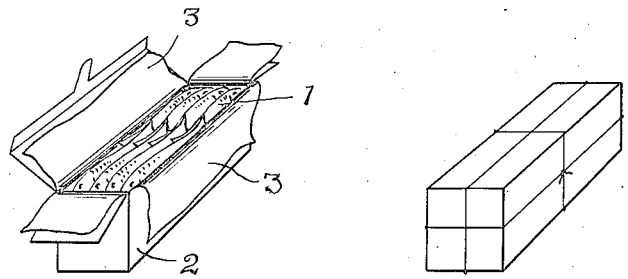
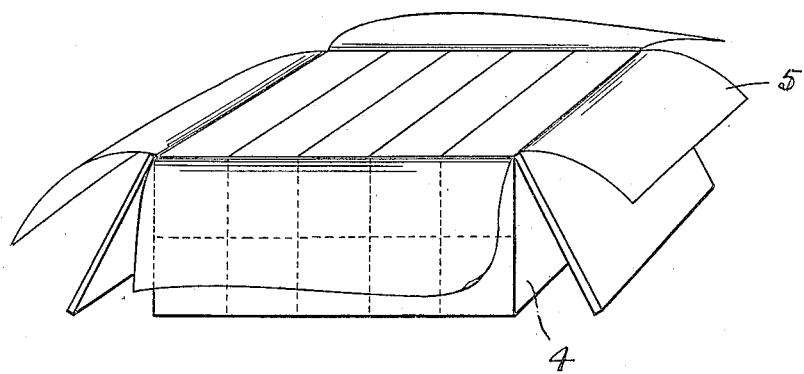

UNITED STATES PATENT OFFICE.

ALEXANDER MILLER McDOUGALL, OF DULUTH, MINNESOTA.

METHOD OF PRESERVING AND MARKETING FRESH FISH.

1,140,178. Specification of Letters Patent. Patented May 18, 1915.

Application filed January 16, 1914. Serial No. 812,552.

*To all whom it may concern:*

Be it known that I, ALEXANDER MILLER McDOUGALL, a citizen of the United States, residing at Duluth, in the county of St. Louis and State of Minnesota, have invented certain new and useful Improvements in Methods of Preserving and Marketing Fresh Fish, of which the following is a specification, reference being had therein to the accompanying drawing.

My invention relates to improvements in methods of preserving and marketing fresh fish.

The object of my invention is to provide a method, whereby fresh fish can be readily preserved and placed in the hands of the consumer in as fresh a state as possible.

Another object of my invention is to provide a method of this character in which the fish can be handled in an absolutely sanitary condition and sold to the consumer, without any liability of the fish becoming spoiled.

In the accompanying drawings: Figure 1 is a perspective view of my improved carton of fish as it is received by the consumer with the top of the carton open. Fig. 2 is a perspective view of my improved carton of frozen fish, placed within a second carton and wrapped ready for shipment. Fig. 3 is a perspective view of a large package showing a series of the small cartons therein in which manner the cartons are frozen and afterward separated and sold to the consumer.

This invention relates more particularly to the handling of fish of small size such as herring, or the like, and the method is to place a number of small fish 1, preferably one or two dozen in a carton 2 as soon as possible after being washed, the latter having been previously lined with a suitable water-proof paper 3. The fish are placed within the carton in rows and having their tails overlapping to make as compact a mass of fish as possible. After the fish are thus placed in the carton, the paper 3 is folded over the top of the fish and the cover closed and the same as nearly hermetically sealed as possible. A number of these filled cartons 2, preferably 10, as shown in the drawings, are tightly packed within the large wooden box 4 which is also lined with paper 5 and is then hermetically sealed as near as possible. The box thus filled, is subjected to a temperature below freezing until the contents of the cartons are frozen solid and are retained in such a condition until delivered to the consumer.

The space between the fish is not filled with liquid, but there being more or less moisture on and within the fish the contents of each carton is frozen into practically a solid mass.

The individual cartons are preferably snugly packed within the wooden box and there being more or less frost formed on the outside of each individual carton caused by the freezing of the contents of the cartons which results in the separate cartons freezing together and forming practically a solid unit or mass.

While I have shown and described each smaller carton with one or two dozen fish, it will be understood that any number of fish can be placed in a carton and any number of cartons can be packed in larger boxes all of which makes a very convenient and attractive package. The paper used in lining both the carton and the receptacle is of a water-proof character which retains any moisture from the fish or from the frost, and whereby the whole series of boxes become a solid unit or mass as heretofore described.

Fish as is well understood is a very perishable food and very hard to get to the consumer in an absolutely sanitary condition, but it has been found that by my improved method of preserving fish they can be delivered to the consumer in an absolutely fresh and sanitary condition.

It is further understood that the small cartons may be placed individually within other cartons and safely shipped comparatively long distances, when this method of packing and preserving is employed.

Having thus fully described my invention, what I claim and desire to secure by Letters Patent is:

1. The herein described method of preserving fish consisting of placing the fish within an air-tight carton and placing a number of cartons within a larger package and freezing the series of cartons into a solid unit or mass.

2. The herein described method of preserving fish consisting of placing the fish within the cartons and placing a series of cartons within a larger receptacle and freezing several cartons into a solid unit or mass.

3. The herein described method of preserving fish consisting of placing the fish within an air-tight carton just after being washed and placing a series of cartons within a larger receptacle and freezing the series of cartons into a solid unit or mass by the frost forming on the outside of the cartons.

4. The herein described method of preserving fish consisting of placing the fish within a carton lined with oil paper just after being washed and placing the cartons within a larger package lined with oil paper and freezing the series of cartons into a solid mass by the frost formed on the outside of the cartons.

5. The herein described method of preserving and marketing fish, consisting of snugly filling a paper lined carton with fresh fish having their tails overlapping, as nearly as possible hermetically sealing the closed carton, subjecting the carton to a freezing temperature until the fish are frozen into a solid mass, placing the frozen carton within a second carton and shipping to the consumer.

In testimony whereof I hereunto affix my signature in the presence of two witnesses.

ALEXANDER MILLER McDOUGALL.

Witnesses:
S. GEO. STEVENS,
R. H. HALL.